United States Patent [19]

Faulkner

[11] 3,883,755

[45] May 13, 1975

[54] ELECTRONIC PHASE-SENSITIVE DETECTOR CIRCUIT WITH D.C. DRIFT NEUTRALIZATION

[76] Inventor: Eric Andrew Faulkner, Home Close, Bradcutts Ln., Cookham Dean, Berkshire, England

[22] Filed: Nov. 20, 1973

[21] Appl. No.: 417,617

[30] Foreign Application Priority Data

Nov. 30, 1972 United Kingdom .............. 55255/72

[52] U.S. Cl. ................ 307/232; 328/133; 329/103; 329/110

[51] Int. Cl. ........................ H03d 13/00; H03d 1/18

[58] Field of Search ....... 307/232, 233, 233 A, 295; 328/133, 134, 155; 329/101–103, 110

[56] References Cited

UNITED STATES PATENTS

| | | | |
|---|---|---|---|
| 3,469,198 | 9/1969 | Madsen | 328/133 X |
| 3,519,841 | 7/1970 | Leinfelder | 307/232 |
| 3,562,675 | 2/1971 | Urell | 307/233 A |
| 3,673,506 | 6/1972 | Faulkner | 329/103 |

*Primary Examiner*—Stanley D. Miller, Jr.
*Attorney, Agent, or Firm*—Larson, Taylor & Hinds

[57] ABSTRACT

A phase-sensitive detector comprises two sections formed of complementary transistors. Each section has two alternative current paths controlled by switching transistors which are switched in antiphase by a reference signal. An input signal is applied differentially to each section and outputs are taken from junctions between paths of respective sections in which conduction takes place simultaneously. The outputs from each junction are representative of the differences in the magnitudes of current in each path connected to a junction. The mean values of the output signals from each junction are summed and integrated and applied as feedback to the inputs in a manner to tend to maintain the mean values at a constant level.

6 Claims, 1 Drawing Figure

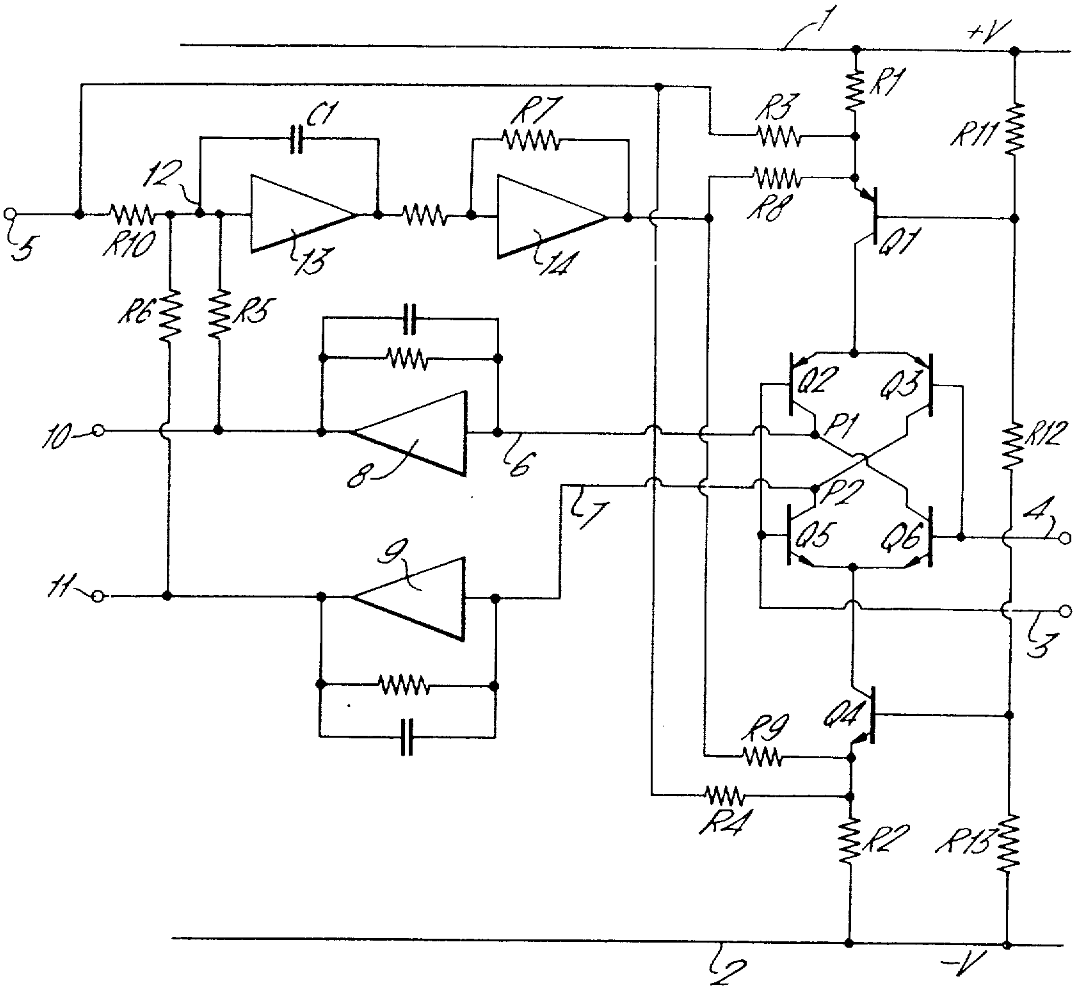
1
+V
R1
R3
R11
C1
R7
12
R8
5
R10
13
14
Q1
R6
R5
Q2
Q3
R12
10
P1
8
6
7
P2
4
Q5
Q6
9
11
3
Q4
R9
R4
R2
R13
2
-V

ELECTRONIC PHASE-SENSITIVE DETECTOR CIRCUIT WITH D.C. DRIFT NEUTRALIZATION

This invention relates to electronic phase-sensitive detector circuit arrangements.

Such circuits operate to switch an input signal between two output terminals under the control of a reference signal.

It is an object of the invention to provide a circuit in which the presence of the output terminals of any spurious signals which are unrelated to the reference signal is minimised as far as possible.

According to the present invention an electronic phase-sensitive detector circuit arrangement comprises two sections each of which sections comprises a signal translation device and two alternative paths for current therethrough with a switching device in each path, connection means for enabling reference signals to be applied to cause one or other of the switching devices of each section to conduct depending on the polarities of the reference signals, junctions between respective paths of the two sections through which current conduction is simultaneous, connection means for enabling an input signal to be applied to at least one of the signal translation devices, output means connected to each of the said junctions to provide respective output signals representative of the difference in current flows between the two paths connected to a junction, means for obtaining a signal representative of the mean value of the output signals, integrating means for the aforesaid signal, and means for applying the output of the integrating means to at least one of the signal translation devices in a manner to tend to maintain said mean value at a constant level.

Preferably the input signal and the output of the integrating means are applied to the signal translation devices of both sections.

In carrying out the invention the signal translation devices and the current switching devices may comprise transistors, the transistors of one section being of complementary type to the transistors of the other section.

The output means may comprise operational amplifiers having resistive feedback so as to provide a voltage output linearly related to the magnitude of their current input. The inputs of such operational amplifiers are virtually at earth potential so that when they are connected to the junctions between the two switching sections the unbalanced currents flowing to their input terminals have virtually no effect on voltages at the current switching devices.

The integrating means may comprise an operational amplifier with capacitive feedback.

In order that the invention may be more fully understood reference will now be made to the drawing accompanying this specification the single FIGURE of which illustrates an embodiment thereof.

Referring now to the drawing there is shown therein a circuit which has two transistor sections. One of the sections is formed by PNP transistors Q1, Q2 and Q3 and the other section is formed by NPN transistors Q4, Q5 and Q6 of complementary type to the transistors Q1, Q2 and Q3. The emitter electrode of transistor Q1 is connected through a resistor R1 to a positive line 1 at a voltage of +V. Transistors Q2 and Q3 both have their emitter electrodes connected to the collector electrode of transistor Q1 and provide two alternative paths for current flowing through transistor Q1. In the NPN section of the circuit the emitter electrode of transistor Q4 is connected through a resistor R2 to a negative supply line 2 at a voltage of −V. The emitter electrodes of transistors Q5 and Q6 are connected to the collector electrode of transistor Q4 and provide two alternative paths for current flowing through transistor Q4. The potentials of the base electrodes of transistors Q1 and Q4 are fixed by being connected to a potential divider chain formed by resistors R11, R12 and R13 connected between lines 1 and 2. To complete the circuit the collector electrodes of transistor Q2 in one section and Q6 in the other section are joined at a junction P1 and the collector electrodes of transistors Q3 and Q5 are joined at a junction P2.

The base electrodes of the transistors Q1, Q3, Q5 and Q6 which act as switching transistors are connected to input terminals 3 and 4 which are arranged to be supplied with reference signals in anti-phase. The bases of transistors Q2 and Q5 are connected to terminal 3 and the bases of transistors Q3 and Q6 are connected to terminal 4. This arrangement ensures that in one half-cycle of the reference signal transistors Q2 and Q6 conduct simultaneously while transistors Q3 and Q5 are switched off while in the opposite half-cycle of the reference signal it is the transistors Q3 and Q5 that conduct and the transistors Q2 and Q6 which are switched off. Accordingly two alternative paths are by this means provided for current which flows through the transistors Q1 and Q4, the switching between the paths being controlled by the reference signals applied to terminals 3 and 4. Input signals to the circuit are applied at a terminal 5 connected to the emitter electrode of transistor Q1 through a resistor R3 and to the emitter electrode of transistor Q4 through a resistor R4. Alternatively the input signal can be applied to the bases of transistors Q1 and Q4. Output signals are taken from the junction points P1 and P2.

It will be seen that in the absence of any input signals being applied to terminal 5 the currents flowing in the transistors Q1 and Q4 will be equal and will be switched by the reference signals applied at terminals 3 and 4. However, such switching will cause no difference between the magnitudes of current flowing through the collector electrodes of transistors Q2 and Q6 when these conduct nor through the collectors of transistors Q3 and Q5 when they conduct. Accordingly there will be no inflow or outflow of current at junctions P1 and P2 in the absence of input signals and despite the application of reference signals. The effect of an input signal at terminal 5 will however cause an increase in current in one of the signal transistors and a corresponding decrease in the current in the other signal transistor. This in turn will produce out-of-balance currents in the collectors of the switched transistors and in each half cycle of reference signal the net out-of-balance current will flow in one or other of the output leads 6 and 7 connected to the junction points P1 and P2. These output currents constitute the output signals from the phase-sensitive detector circuit.

To convert the output currents into usable output signals they are applied as the inputs to two operational amplifiers 8 and 9 which are each provided with resistive feed-back paths shunted by capacitors. Operational amplifiers 8 and 9 have the property that they provide a voltage output linearly related to the magnitude of the current input and the current input terminal is a virtual earth. Accordingly an output voltage will appear between the output terminals 10 and 11 of operational amplifiers 8 and 9.

To set up the operating currents of transistors Q1, Q2, Q3, Q4, Q5 and Q6, a signal is obtained which is representative of the mean value of the voltages at terminals 10 and 11 and this signal is after appropriate modification applied to the signal transistors Q1 and Q4. To this end resistors R5 and R6 are connected to terminals 10 and 11 and to a summing junction 12. The current into summing junction 12 through R5 and R6 is thus proportional to the mean of the voltages at terminals 10 and 11. Junction 12 is connected to the input terminal of an operational amplifier 13 having capacitive feedback from its output to its input provided by a capacitor C1. A resistor in series with capacitor C1 may be included to improve stability. Thus operational amplifier 13 acts as an integrator providing an output signal which is the time integral of the total current through R5 and R6. This integrated signal is then fed through a further operational amplifier 14 having a resistive feedback R7 and which functions as a means for reversing the signal of the integrated signal. This sign reversed signal is then applied through respective resistors R8 and R9 to the emitter electrodes of transistors Q1 and Q4.

The circuit between terminals 10 and 11 and the signal transistors Q1 and Q4 constitutes a negative feedback path from terminals 10 and 11 to the signal transistors. Thus if any drifts occur in the closed loop so formed an opposed time-integrated signal is applied which has the appropriate polarity to tend to neutralise such drifts. A resistor R10 is connected between input terminal 5 and summing junction 12 to prevent this feedback action from reducing the gain of the circuit at low frequencies.

I claim:

1. An electronic phase-sensitive detector circuit comprising two sections each of which sections comprises a signal translation device and two alternative paths for current therethrough with a switching device in each path, the switching devices of one section being complementary to the switching devices of the other section, connection means for enabling reference signals to be applied so as to cause one or other of the switching devices of each section to conduct depending on the polarities of the reference signals, junctions between respective paths of the two sections through which current conduction is simultaneous, connection means for enabling an input signal to be applied to at least one of the signal translation devices, output means connected to each of the said junctions to provide respective output signals representative of the difference in current flows between the two paths connected to a junction, means for obtaining a signal representative of the mean value of the output signals, integrating means for the aforesaid signal, and means for applying the output of the integrating means to at least one of the signal translation devices in a manner to tend to neutralise dc drift.

2. The circuit as claimed in claim 1 in which the input signal is applied to the signal translation devices of both sections.

3. The circuit as claimed in claim 1 in which the output of the integrating means is applied to the signal translation devices of both sections.

4. The circuit as claimed in claim 1 in which the signal translation devices and the current switching devices comprise transistors.

5. The circuit as claimed in claim 1 in which the output means comprise operational amplifiers having resistive feedback so as to provide voltage outputs linearly related to the magnitudes of their current inputs.

6. The circuit as claimed in claim 1 in which the integrating means comprises an operational amplifier having capacitive feedback.

* * * * *